March 7, 1944. A. F. LAYS 2,343,777
ARTIFICIAL TEETH SELECTION RIM
Filed March 13, 1940
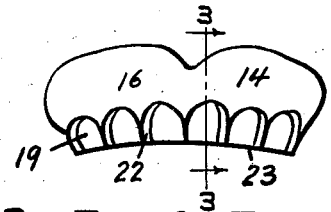
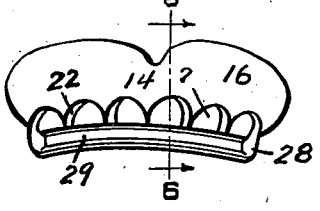
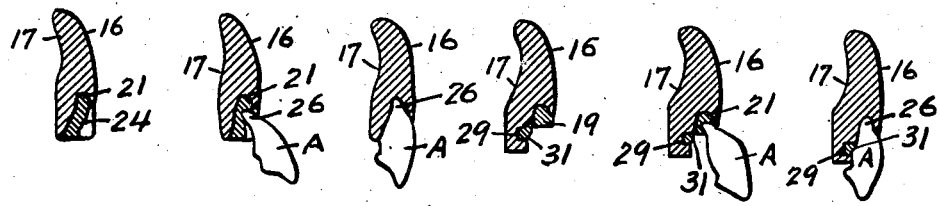
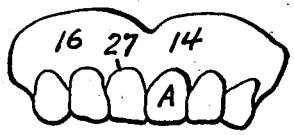
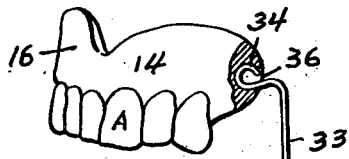
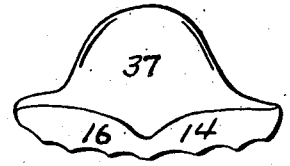
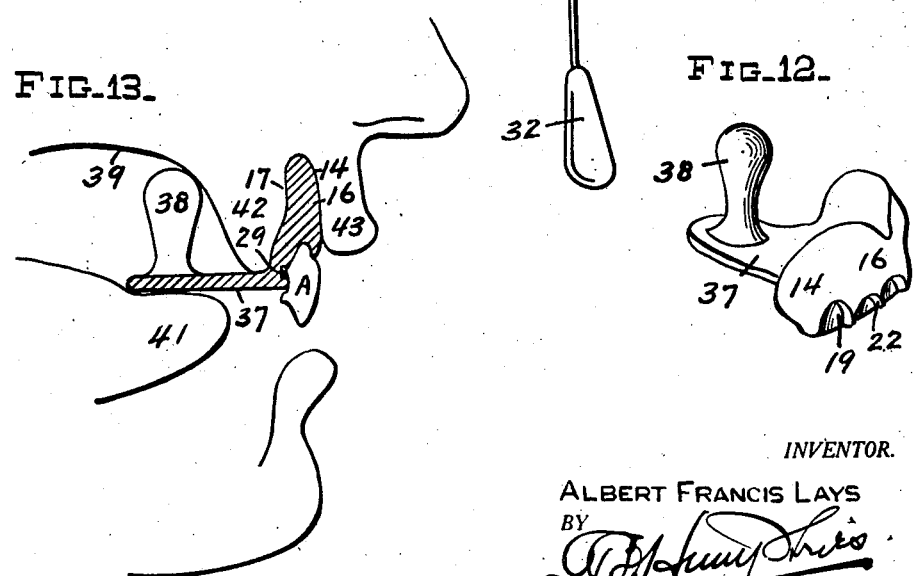
INVENTOR.
ALBERT FRANCIS LAYS
BY
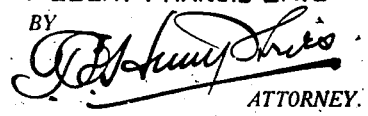
ATTORNEY.

Patented Mar. 7, 1944

2,343,777

UNITED STATES PATENT OFFICE 2,343,777

ARTIFICIAL TEETH SELECTION RIM

Albert Francis Lays, Pelham Manor, N. Y., assignor to The Dentists' Supply Company of New York, New York, N. Y., a corporation of New York Application March 13, 1940, Serial No. 323,682

2 Claims. (Cl. 32—71)

This invention relates to an artificial teeth selection rim, or trial rim or denture, and has particular reference to a rim or trial denture which will approximately fit the dental arch of an individual, and on which artificial teeth may be temporarily set for selection purposes.

In the proper method for selection of artificial anterior teeth the dentist takes an impression, pours a model and adds to that a bite block to restore the labial fullness and establish the proper facial profile; then artificial teeth may be set therein, aligned or arranged to produce the labial fullness and be of such size and positioned so that they tend to create the facial profile established by the bite block.

Although this is generally accepted as being the correct method, it is not generally followed in practice because of lack of time, and oft-times because the advantages of doing or following such procedure are not recognized by the dentist.

The dentist usually resorts to the use of a selection rim containing a wax insert or plastic insert on which the teeth are arranged, but which does not adequately show how these teeth will actually appear in the finished denture. This practice merely permits an approach to the desired appearance.

In carrying out the proper procedure, the dentist is obliged to build a trial denture with wax blocks or rims of proper height and fullness in order to check his selection of molds and shades for the patient. That procedure necessitates considerable work and several appointments.

The object of the present invention is to provide a selection rim, or trial rim or denture, which will give the desired labial fullness, establish the proper profile, and on which artificial teeth may be temporarily mounted in order to procure the best esthetic results.

A further object of the invention is to provide means for covering or obscuring the root or gingival ends of the artificial teeth so that the gum line will appear as in the finished denture.

A still further object of the invention is to provide a selection rim in which artificial teeth may be quickly and conveniently mounted, moved and replaced.

Another object of the present invention is to provide a selection or trial rim which will simulate the appearance of a finished denture.

Another object of the invention is to provide means of appeal to the esthetic sense of the patient in reference to the type of teeth or denture best suited to his individual case.

According to the invention, the selection rim, trial rim or denture comprises a body of rigid material, arranged to give labial fullness and to substantially fit the dental arch of an individual, sockets to receive and obscure the gingival ends of artificial teeth, and means for temporarily holding said teeth in position on said body.

The means for holding the teeth may be of wax or other plastic substance, and the selection rim may be provided with means for securing the same to a handle for holding the rim in position in the mouth of the individual, or the rim may be provided with a palate plate on which means may be placed so that the individual may press the selection rim into proper position in the mouth.

The drawing illustrates embodiments of the invention, and the views therein are as follows:

Figure 1 is a front elevation of a selection rim made according to the invention, Figure 2 is a like view, illustrating a modification, Figure 3 is a vertical sectional view taken on the line 3—3 of Figure 1, and showing a plastic in the tooth socket, Figure 4 is a similar view, showing the method of attaching teeth in said rim, Figure 5 is a like view, showing a tooth in position, Figure 6 is a similar view taken on the line 6—6 of Figure 2, and showing plastic material for engaging a tooth to be inserted, Figure 7 is a similar view, showing the method of attaching teeth, Figure 8 is a like view, showing a tooth applied, Figure 9 is a front elevation of one of the rims with teeth applied, Figure 10 is a perspective view, showing the rim mounted on a handle for holding same in the patient's mouth, Figure 11 is a modified form of either of the rims shown in Figures 1 and 2, Figure 12 is a perspective view, illustrating the mounting of means for engaging the palate, and Figure 13 is a fragmentary view showing the utility of the selection or trial rim of Figure 12.

Referring now to Figures 1, 3, 4 and 5, the selection or trial rim 14, which may be made from any rigid material such for instance as Vulcanite, Bakelite, glass, porcelain, etc., is provided with a curvature which may vary for the dental arches of different individuals.

The body comprises a part 16 which is adapted to rest between the dental arch and the lip, and the rear face 17 substantially conforms to the contour of the dental arch.

The front of the rim is provided with recesses 19 which are undercut as at 21. Each of these recesses is self-contained; that is to say, it has a wall 22 extending substantially down to the lower edge 23 of the rim.

These recesses may be provided with plastic material 24 (see Figs. 3 and 4), so that when a tooth A is applied the gingival root end 26 of the tooth will displace a part of this plastic material and will temporarily secure the said tooth in position on the said rim.

The recesses 19 are slightly larger than the dimensions of the tooth with which they are intended to be used so that even though the root end of the tooth is received within the undercut part 21 of said recesses, the tooth may be moved slightly from side to side, forward, backward, or slightly twisted. However, the undercutting 21 of the recesses is intended to completely obscure the root end of the tooth so that the gingival collar will lie flush with the material surrounding said recesses.

Figure 9 will illustrate a rim having teeth applied thereto, and in which it will be seen that the teeth have been set to produce the best artistic result by locating them with relation to each other in such manner that they will not seem too conventional. This figure also shows the gingival line 27 of the tooth A flush with the recess wall.

The selection or trial rim shown in Figure 2 is identical witth that shown in Figure 1, with the exception that the former is provided with a bottom extension 28 which has the same curvature as the rim. Immediately below the bottoms of the side walls 22, this extension 28 is provided with an arcuate channel or depression 29.

In Figures 6 and 7 it will be seen that plastic material is applied not only to the recesses 19, as explained in connection with Figure 1, but also to the arcuate channel or recess 29, the plastic material in Figures 6 and 7 being characterized as 31. This plastic filled arcuate channel provides additional temporary holding means for the teeth which are applied, and when teeth having pins are employed with the selection or trial rim, the pins may be imbedded in the plastic material in said arcuate channel.

It will be apparent, by reason of the recesses 19 being slightly larger than the teeth which are to be applied thereto, that when the teeth have been applied, as shown in Figures 4, 5, 7 and 8, sufficient of the plastic material will always remain in said recess to hold the said tooth in position and enable it to be properly displayed.

In Figure 10, one of the selection rims is shown with means for holding the same in position in the mouth of the patient. This means may consist of a handle 32, having a wire 33 with a looped end 34, such end being adapted to be sprung into a constricted opening 36 provided for such purpose.

Figure 11 shows a selection or trial rim 14 of either type illustrated in Figures 1 or 2, and having extending substantially horizontally therefrom a plate 37. It will, of course, be understood that the vaults of different individuals vary in height, etc. The plate 37 may have mounted thereon means 38 for engaging the palate 39 of the patient so that when the tongue 41 of the patient is pressed against the bottom of the plate 37, the selection or trial rim 14 will be held in place between the dental arch 42 and the lip 43.

In Figure 12 there is shown a selection or trial rim 14 of the type shown in Figure 1, and with the rearwardly extending plate 37 integrally formed therewith. The spacer 38 mounted on the plate 37 may be a piece of wax, molded to substantial shape by the fingers of the dentist, or this spacer may be of harder material mounted on the plate 37 in any suitable manner and selected for the particular type of vault in any given case.

In Figure 13 the selection or trial rim 14 of the type shown in Figure 2 has the rearwardly extending plate 37 integrally formed therewith, and running back from the extension 28. By a slight pressure of the tongue 41 it will be apparent that the rear surface 17 of the rim rests lightly against the dental arch 42, and the lip 43 covers the major portion of such rim so that both the dentist and patient can view the effect and arrange the teeth and their positions to give the best effects.

Of course, the selection rim illustrated and described herein may be modified and changed in various ways without departing from the invention herein set forth and hereafter claimed.

The invention is hereby claimed as follows:

1. An artificial teeth selection rim comprising a body of rigid material arranged to approximately fit the dental arch of an individual, said body having recesses to receive and obscure the gingival ends of artificial teeth, said rim adapted to receive means for temporarily holding said teeth in position on said body, and a palate plate extending rearward of said body for supporting a spacer which may be pressed against the palate of said individual to hold said rim in position in the mouth.

2. An artificial teeth selection rim comprising a body of rigid material arranged to approximately fit the dental arch of an individual, said body having recesses to receive and obscure the gingival ends of artificial teeth, a channel in said body, said channel provided to receive plastic means for temporarily holding said teeth in position on said body, and a palate plate extending rearward of said body for supporting a spacer which may be pressed against the palate of said individual to hold said rim in position in the mouth.

ALBERT FRANCIS LAYS.